US011435929B2

United States Patent
Ganesan et al.

(10) Patent No.: US 11,435,929 B2
(45) Date of Patent: Sep. 6, 2022

(54) SYSTEM AND METHOD FOR CONTENT ADDRESSABLE STORAGE SYSTEM UPDATE APPLIANCE

(71) Applicant: DELL PRODUCTS, LP, Round Rock, TX (US)

(72) Inventors: Vaideeswaran Ganesan, Bangalore (IN); Hemant Gaikwad, Bangalore (IN); Pravin Janakiram, Bangalore (IN)

(73) Assignee: Dell Products L.P., Round Rock, TX (US)

(*) Notice: Subject to any disclaimer, the term of this patent is extended or adjusted under 35 U.S.C. 154(b) by 92 days.

(21) Appl. No.: 17/005,102

(22) Filed: Aug. 27, 2020

(65) Prior Publication Data

US 2022/0066673 A1    Mar. 3, 2022

(51) Int. Cl.
G06F 3/06          (2006.01)
H04L 9/06          (2006.01)
G06F 21/57         (2013.01)

(52) U.S. Cl.
CPC .......... *G06F 3/0647* (2013.01); *G06F 3/0607* (2013.01); *G06F 3/0644* (2013.01); *G06F 3/0683* (2013.01); *G06F 21/572* (2013.01); *H04L 9/0643* (2013.01)

(58) Field of Classification Search
CPC .... G06F 3/0683; G06F 3/0644; G06F 3/0647; G06F 3/0607; G06F 21/572; H04L 9/0643

USPC ......................................................... 711/154
See application file for complete search history.

(56) References Cited

U.S. PATENT DOCUMENTS

| 9,213,537 B2 | 12/2015 | Bandakka et al. |
| 10,552,145 B2 | 2/2020 | Rosner et al. |
| 2019/0236164 A1* | 8/2019 | Felts ............... G06F 16/137 |

* cited by examiner

*Primary Examiner* — Hua J Song
(74) *Attorney, Agent, or Firm* — Larson Newman, LLP (57) ABSTRACT

A system update appliance includes a processor and a memory device with a Content Addressable Storage (CAS) space and a location addressable storage space. The location addressable storage space partitioned into an object storage space and a device storage space. The processor stores a device entry in the device storage space. The device entry is associated with a device external to the system update appliance and includes a component entry for a component of the device. The component operates based on an update. The component entry includes a description of the component and a pointer to a record stored in the CAS space. The processor stores the record in the CAS space. The record is associated with a combination of the component and the first update. The record includes the description, a second pointer to an update repository, and a third pointer to the object storage space. When the update is not stored in the object storage space, the third pointer is a null pointer and when the update is stored in the object storage space, the third pointer includes an address of the update in the object storage space.

20 Claims, 6 Drawing Sheets

SYSTEM AND METHOD FOR CONTENT ADDRESSABLE STORAGE SYSTEM UPDATE APPLIANCE

FIELD OF THE DISCLOSURE

This disclosure generally relates to information handling systems, and more particularly relates to providing a content addressable storage system update appliance.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A system update appliance may include a processor and a memory device with a Content Addressable Storage (CAS) space and a location addressable storage space. The location addressable storage space may be partitioned into an object storage space and a device storage space. The processor stores a device entry in the device storage space. The device entry may be associated with a device external to the system update appliance and includes a component entry for a component of the device. The component may operate based on an update. The component entry may include a description of the component and a pointer to a record stored in the CAS space. The processor may store the record in the CAS space. The record may be associated with a combination of the component and the first update. The record may include the description, a second pointer to an update repository, and a third pointer to the object storage space. When the update is not stored in the object storage space, the third pointer may be a null pointer and when the update is stored in the object storage space, the third pointer may include an address of the update in the object storage space

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
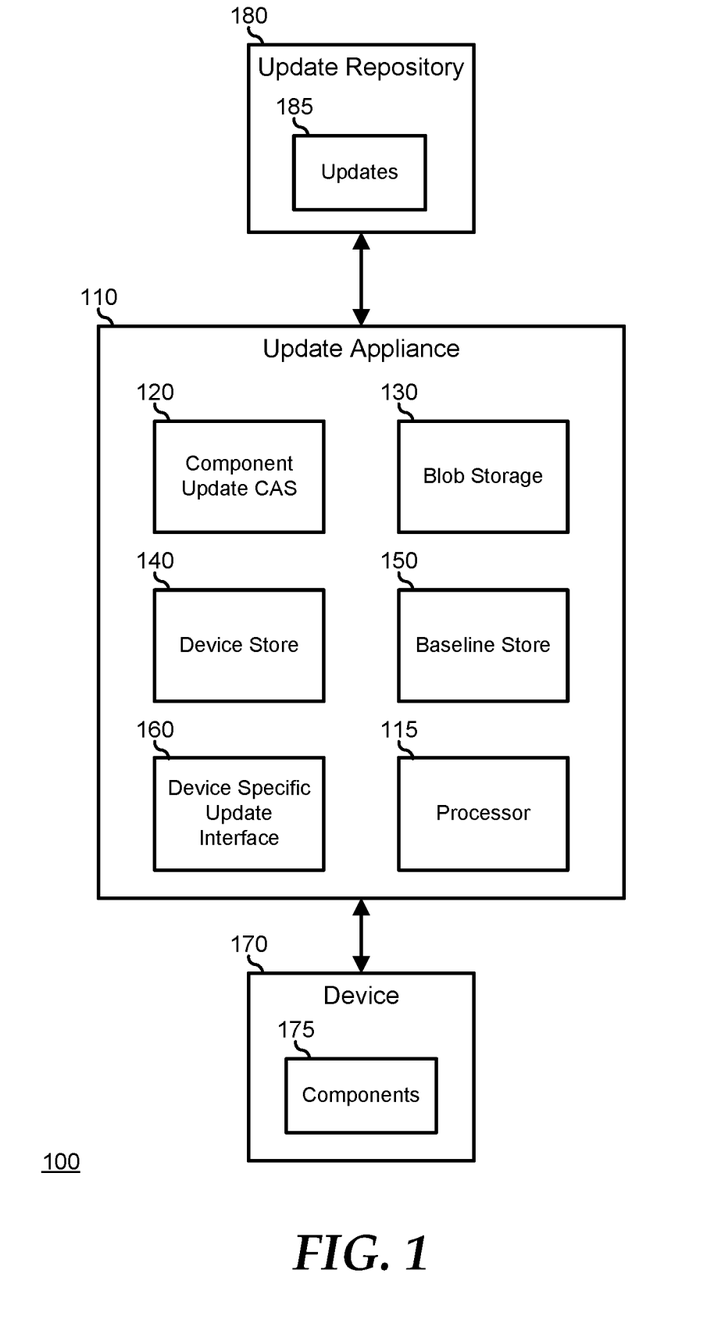
FIG. 1 is a block diagram of an update system according to an embodiment of the current disclosure.

FIG. 1 illustrates an update system 100 for updating information handling systems. Update system 100 includes an update appliance 110, devices 170, and an update repository 180. Update appliance 110 represents a storage device or capacity, such as a hard disk drive, a solid state disk drive, a storage array, a storage array, or the like. Update appliance 110 will be understood to include an associated data communication interface and a processing element such as dedicated storage controller, a processor, or the like that is configured to provide the functions and features as described herein. An example of update appliance 110 may include a network attached storage (NAS) device, a storage area network (SAN), a stand-alone disk storage device, or the like. Update appliance 110 includes a processor 115, a component update content-addressable storage (CAS) 120, a binary large object (blob) storage 130, a device store 140, a baseline store 150, and a device specific update interface 160. Each of component update CAS 120, blob storage 130, device store 140, baseline store 150, and device specific update interface 160 may represent a hardware storage module, a storage device or storage space on a shared storage device, or other device that is configured to store information and to provide the functionality as described herein. The functions and features of update appliance 110 and of component update CAS 120, blob storage 130, device store 140, baseline store 150, and device specific update interface 160 will be described further below, with reference to FIG. 2.

Devices 170 represent one or more information handling system. Examples of devices 170 may include a stand-alone computer, such as a desktop computer, a workstation, a laptop computer, a portable device, and the like, an element of datacenter equipment, such as a rack server, a blade server, a storage server, a network server, a switch/router, an intelligent power module for a server or a server rack, or other elements of datacenter equipment, or the like. Each particular device of devices 170 includes components 175. Components 175 represent elements of a particular device that are capable of being updated by the downloading and installing of code. As such, components 175 may be understood to be elements of the particular device that are associated with the performance of the processing tasks on the device. For example, components 175 may include system BIOS code or Universal Extensible Firmware Interface (UEFI) code that controls the overall operation of device 175, may include firmware code or driver code associated with various functions, features, and elements of the device, such as network interface cards (NICs), storage controllers, graphic processing units (GPUs), field-programmable gate arrays (FPGAs), and the like, may include service, process, or utility code executed by the device, or other code that provides additional functionality to the device in performing the processing tasks on the device. Components 175 may further be understood to be elements of device 170 that are associated with the processing tasks themselves, such as operating system (OS) code and for providing an operating environment on device 170, and program code for providing the processing tasks executed on the device, such as office productivity applications, web hosting services, database services, or other processing tasks, patches to the OS or application code, or the like, as needed or desired. It will be understood that, as used herein, components 175 may be associated with various hardware devices that are themselves capable of being updated by the installation of modules or devices to the hardware devices, or the replacement of the hardware devices themselves. However, for the purposes of the present disclosure, an update will be understood to represent information or data that is transmissible from a storage element to devices 170, and that can be operated upon by the device to update, alter, improve, or otherwise change the functionality of the associated components 175.

Update repository 180 represents one or more master storage location that stores updates to the code of the various elements. For example, update repository 180 may represent a web-accessible location associated with a device or component where updates to the code are released and from which the updates may be downloaded. Here, for example, where a particular device of devices 170 represents an element of datacenter equipment that is manufactured by a particular manufacturer, update repository 180 may represent a storage location where updates for the components of the device may be securely obtained. In another example, where a particular component 175 represents a component that is manufactured or otherwise provided by a different manufacturer than the device, the manufacturer of the component may maintain a similar storage location where updates for the particular component may be securely obtained. Likewise, where another particular component represents software or an application, a supplier of the software or application may maintain a similar storage location where updates for the particular software or application may be securely obtained. Note that, as used herein, the term "update" is not necessarily meant to imply a time-based relationship. Rather, an update will be understood to refer to a particular version of whatever type of code is associated with each component. For example, where a component represents an element that utilizes firmware, then a particular update for that element will be understood to represent a particular firmware version. On the other hand, where a component represents a program or application, the a particular update for that program or application will be understood to represent a particular program or application version.

It has been understood by the inventors of the present disclosure that, particularly in a datacenter environment, updates are difficult to manage. In particular, updates in a datacenter include not only a wide variety of types of updates, such as BIOS/UEFI, firmware, drivers, patches, OS and application updates, and the like, but also include updates for a wide variety of types of datacenter equipment, such as servers, switches, routers, storage, intelligent power supplies, and the like. As such, the maintenance and management of updates for all of the components of a datacenter typically occupy a significant amount of storage space. For example, a typical firmware update for a particular server model may require 100-200 MB of storage space, while a major refresh may require 300-500 MB of storage space, and such storage space may need to be allocated for each different type of datacenter equipment in the datacenter, such that the storage allocation just for updates may run to greater than 10 GB. A particular challenge here is in determining where to allocate the storage. Careful consideration must be made to ensure that the storage location is secure from external tampering and threats. Moreover, the various types of updates often necessitate different workflows on the elements of datacenter equipment. For example, BIOS/UEFI or firmware updates may necessitate rebooting of the datacenter equipment, which in turn necessitates migrating workloads and flows to other elements of datacenter equipment prior to the required reboot. Other updates may not demand rebooting of the elements of datacenter equipment, but may utilize different flows to incorporate the updates. For example, some updates may need to be installed via a baseboard management controller or embedded controller on the elements of datacenter equipment, while other updates may need to be executed within the OS environment.

Figure 2:
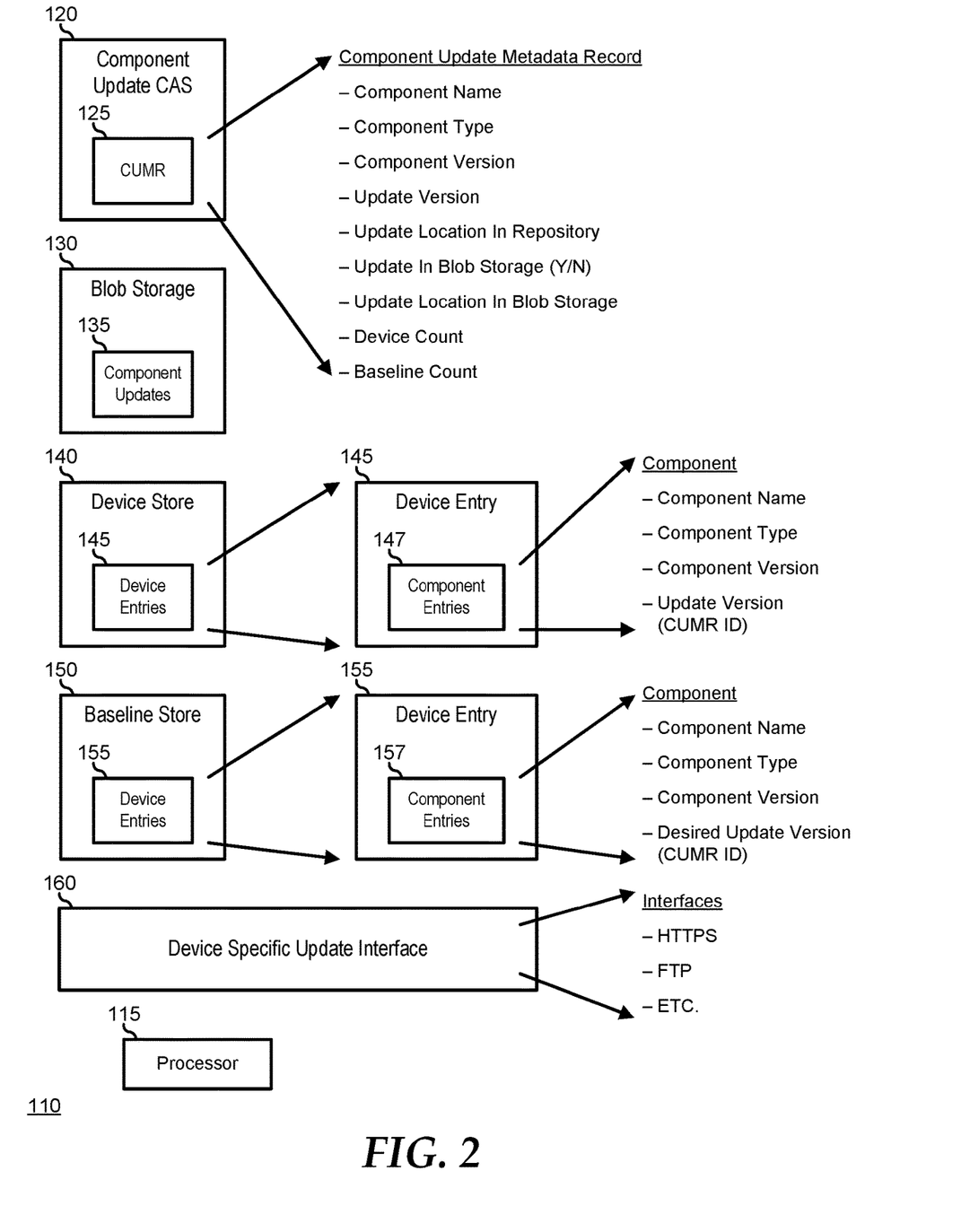
FIG. 2 is a block diagram of an update appliance according to an embodiment of the current disclosure.

FIG. 2 illustrates update appliance 110, including processor 115, component update CAS 120, blob storage 130, device store 140, baseline store 150, and device specific update interface 160. Processor 115 represents a processor of an information handling system, a dedicated processor of update appliance 110, or another type of processor, such as a FPGA, a System-on-a-Chip (SoC), or another processor, as needed or desired. processor 115 operates to provide the functions and features of update appliance 110 as described herein. Component update CAS 120, blob storage 130, device store 140, baseline store 150, and device specific update interface 160 each represent a storage device or storage space on a storage device. Component update CAS 120 is configured and operated as a CAS storage. In particular, component update CAS 120 operates to store component update metadata records (CUMR) as objects that are each identified by a unique identifier, and each CUMR is indexed into component update CAS based upon a hash of the contents of the CUMR, such that, rather than being accessed based upon a location of the CUMR within the component update CAS, each CUMR is accessed based upon the identifier. Here, each CUMR includes a component name, such as a make and model of the component, a component type, a component version, an update version associated with the component, a location of the update in update repository 180, a flag to identify whether or not the update is currently stored in blob storage 130, a location within the blob storage that the update is stored when the update is stored therein, a device count, and a baseline count.

Here, it will be understood that component update CAS 120 will store a unique CUMR for each component/update version. That is, where a particular component has more than one available update version, component update CAS 120 will store more than one CUMR for that component, each CUMR including the identity of a different update version. Note further that component update CAS 120 will be understood to store CUMRs associated with the various updates, but will not be understood to store the actual code that makes up the various updates. Here, when the flag in a particular CUMR identifies that the update is currently stored in blob storage 130, the field for the location of the update in the blob storage is loaded with the location of the update within the blob storage. As such, the size of component update CAS 120 will be relatively small as compared with the size of blob storage 130. For example, as noted above, a major refresh for a particular device may require 300-500 MB of storage space, and a typical datacenter may include hundreds of different types of devices. As such, blob storage 130 may be provided with a storage capacity of 500 GB to 1 TB or more.

Device store 140 includes a current device entry 145 for each device of devices 170. Device store 140 represents a current state of devices 170, in terms of which updates are currently being utilized by the components of each particular device. As such, each current device entry 145 includes multiple current component entries 147 that describe each component and the current update status for the component. In particular, current component entries 147 include the component name, type, and version, and a pointer to the record ID of the CUMR 125 that is associated with the particular update that is currently being utilized by the component. Note that were a particular device of devices 170 includes two or more of a particular type of component, and any of the components are loaded with different update versions, then current component entries 147 for those components will point to different CUMRs.

Baseline store 150 is similar to device store 140, in that the baseline store includes a baseline device entry 155 for each device of devices 170. However, here, baseline store 150 represents a desired state of devices 170, in terms of which updates are desired to be utilized by the components of each particular device. As such, each baseline device entry 155 includes multiple baseline component entries 157 that describe each component and the desired update status for the component. In particular, current component entries 147 include the component name, type, and version, and a pointer to the record ID of the CUMR 125 that is associated with the particular update that is desired to be utilized by the component.

Device specific update interface 160 includes various application programming interfaces (APIs), utilities, services, protocols, and the like that permit update appliance 110 to access devices 170 to receive information related to each device's inventory of components 175, and to provide component updates 135 to the devices for installation to the components. For example, device specific update interface 160 may include various file transfer protocols, such as HTTPS, FTP, TFTP, and the like, management tools such as Yellowdog Update, Modified (YUM) management utilities, Windows Server Update Services, Windows Services Management (WSMan) services, various infrastructure as code (IaaC) services (e.g., GitHub, Ansible, Terraform, etc.), and the like, local docker/container services such as Docker and the like, a Dell PDK Catalog and the like, or other services or tools, as needed or desired. Here, the various APIs, utilities, services, and protocols are exposed to devices 170 as virtual APIs which internally point to a common virtual directory. Here, it will be understood that devices 170 will each expect updates to be provided in a particular directory format that is consumable by the particular device. Thus, device specific update interface 160 operates to virtualize the interfaces to the various devices 170. Device specific update interface 160 also operates as a Preboot Execution Environment (PXE) service, to support various boot protocols such as BOOTP and the like.

In operation, update appliance 110 may start in a clean state. That is, component update CAS 120, blob storage 130, device store 140, and baseline store 150 may be empty, and device specific update interface 160 may include the various APIs, utilities, services, protocols, and the like that permit update appliance 110 to access devices 170 to receive the information related to each device's inventory of components 175. Then, when update appliance 110 is installed into update system 100, the update appliance initiates a search of devices 170, and extracts an inventory of components 175 that reside on each device. Upon finding an initial device, update appliance 110 creates a CUMR 125 in component update CAS 120 for each unique component in the device, and increments the device counter in each CUMR. Update appliance 110 further creates a current device entry 145 in device store 140, and populates the current device entry with the associated current component entries 147. Upon finding subsequent devices 170, update appliance 110 evaluates each component 175 of the device to determine if any of the existing CUMRs 145 are applicable to the components. If so, update appliance 110 increments the device count in the relevant CIUMRs 125. If not, update appliance 110 again creates a CUMR 125 in component update CAS 120 for each unique component in the device, and increments the device counter in each CUMR. Here, again, update appliance 110 creates a new current device entry 145, and populates the current device entry with the associated current component entries 147.

In creating CUMRs 125, update store 110 operates to fill in particular fields based as far as possible upon the information included in the inventory information. For example, the inventory information may include component names, component types, component versions, and associated update versions. In addition, update store 110 operates to fill in other fields in CUMRs 125 based upon pre-determined information stored in the update appliance. For example, update appliance 110 may be configured to include the web addresses of one or more commonly accessed update repositories. Here, update store 110 operates to access the one or more update repositories to determine if the current updates are available, and populates the repository location field when current updates are available. In another case, where update appliance 110 is unable to locate a current update in any of the pre-determined update repositories, the update appliance operates to provide a prompt to a user of the update appliance to provide information to populate the repository location field. In a particular embodiment, a user of update appliance 110 configures the update appliance with access credentials to a secure update repository. For example, where a large quantity of datacenter equipment in a datacenter is provided by a common manufacturer, that manufacturer may provide access to a secure update repository that includes updates that are recommended, warranted, or otherwise available to users of that manufacturer's products. Here, a datacenter administrator can enter the access credentials to the manufacturer's secure update repository to update appliance 110 via a user interface API.

In a particular embodiment, when update appliance 110 creates a new CUMF 125 in component update CAS 120, the update appliance sets the flag of the CUMR to indicate that the update is not in blob storage 130, and the update appliance does not download the update to the blob storage. Here, it may be desirable to save storage space on blob storage 130 for updates that are demonstrated to be needed, and to not fill the storage space with seldom used updates. For example, where a component is associated with an old and very stable update, it may be more efficient to download that update from the identified repository location only when demanded, rather than to expend valuable storage space on blob storage 130. In another embodiment, when update appliance 110 creates a new CUMF 125 in component update CAS 120, the update appliance downloads the update to the blob storage 130, sets the flag of the CUMR to indicate that the update is in the blob storage, and writes the location of the update in the blob storage in the update location field of the CUMR. Here, for example, where blob storage 130 is large, it may be deemed to be more efficient to download updates at times when network traffic is low, so that, in case the update is needed at a time when network traffic is high, the network does not need to be accessed to get the update.

In a particular embodiment, update appliance 110 further operates to mirror the information in device store 140 to baseline store 150. Similarly, each CUMR 125 is modified to set the baseline count to equal the device count. Here, each current device entry 145 is assumed to represent the desired state for the devices in terms of which updates are installed. Here further, update appliance 110 operates to identify the components associated with CUMRs 145, and the associated update versions. Then, by accessing update repository 180, update appliance 110 determines if newer updates are available for the components identified by CUMRs 125. In a particular embodiment, when a new update is detected, update appliance 110 operates to create a new CUMR associated with the new update, to identify the baseline device entries 155 that utilize the outdated update, and to modify the relevant baseline component entries 157 in the identified baseline device entries with the new CUMR. In this way, new updates can be automatically ascribed to the baseline device entries 155.

In another embodiment, baseline store 150 remains empty until a user of update appliance 110 provides the baseline device entries 155. Here, it will be understood that a datacenter administrator may desire to exercise greater control over the updates that are ascribed to baseline device entries 155. For example, an administrator may have knowledge that a particular update version demonstrates an incompatibility with another feature of a particular device, or may have a desire to demonstrate the compatibility of new updates in a sandbox environment before approving the use of a new update on production datacenter equipment. As such, the administrator may decide that an older update version is desirable, and may edit the baseline entry to reflect the older update version. Here, update appliance 110 may yet provide the current device entries 145 from device store 140 via an API for consideration by the administrator, and the API may permit editing of the baseline device entries to be loaded into baseline store 150. Here further, update appliance 110 operates to manage the baseline count as needed to accurately reflect the number of baseline device entries 155 that point to each CUMR 125. In another embodiment, a combination of automatic updates and administrator managed updates may be provided. Here, a particular set of components may be identified as being "safe" to automatically provide updates as they become available, and update appliance 110 operates to automatically update the baseline device entries 155 for those components, while other components may be identified as needing administrator-managed updates.

In a particular embodiment, update appliance 110 operates to automatically harmonize current device entries 145 with baseline device entries 155. Here, update appliance 110 detects any current component entries 147 that point to different CUMRs 125 than the associated baseline component entries 157, and operates to push the updates associated with the baseline component entries to the associated components. Here, update appliance 110 may operate to harmonize the updates when differences are detected, or may operate to harmonize the updates based upon an update schedule, such as once a day, or once a week, or when processing loads of devices 170 are below a particular threshold, as needed or desired. In another embodiment, update appliance 110 operates to harmonize the updates based upon a user input. Here, for example, a database administrator my determine that a particular update is critical, can modify baseline device entries 155, and can direct update appliance 110 to immediately harmonize the updates. In yet another embodiment, a particular device may operate to request an update for a particular component from update appliance 110. In any of the above embodiments, if a particular update is not currently stored in blob storage, update appliance 110 operates to download the update from the identified repository, to store the update to the blob storage, to modify the flag in the associated CUMR 124 to indicate that the update is located in the blob storage, and to modify the associated CUMR with the location of the update in the blob storage.

In a particular embodiment, in providing updates to devices 170, update utility operates to create a read-only virtual store of the updates. For example, update utility 110 may include a web-based service, and may provide a URL to each device 170 with links that operate to launch the update process for each component. It will be understood that update appliance 110 is a secure device, employing various security measures to ensure against unauthorized tampering and access by unauthorized devices. The methods for securing a device are known in the art and will not be further describe herein, except as need to illustrate the current embodiments.

Update appliance 110 operates to manage the contents of component update CAS 120 and blob storage 130. In particular, update appliance 110 operates to detect when the storage capacity of either component update CAS 120 or blob storage 130 exceeds a threshold level, the and provides a delete priority for the CUMRs 125 and component updates 135. Here, update appliance 110 operates to determine a priority for the deletion of CUMRs 125 and component updates 135, such that one, the other, or both are deleted, based upon the device count field, the baseline count field, and the blob location field in each CUMR. Table 1, below, illustrates an exemplary deletion priority.

TABLE 1

| Device Counter | Baseline Counter | Location | Action | Delete Priority |
|---|---|---|---|---|
| 0 | 0 | <empty> | Delete CUMR | Immediate |
| 0 | 0 | Points to file blob | Delete file, Delete CUMR | Immediate |
| 0 | >0 | <empty> | Retain Record | Lowest |

TABLE 1-continued

Content Deletion Priority

| Device Counter | Baseline Counter | Location | Action | Delete Priority |
|---|---|---|---|---|
| 0 | >0 | Points to file blob | Retain Record | P1-delete |
| >0 | 0 | <empty> | Retain Record | |
| >0 | 0 | Points to file blob | Retain Record | P0-delete |
| >0 | >0 (M) | <empty> | Retain Record | |
| >0 (N) | >0 (M) | Points to file blob | Retain record | P2-delete Sub-priority: 1/(N + M) |

In a particular embodiment, update appliance 110 operates to evaluate metrics and statistical metrics based upon the contents of CUMRs 125. For example, update appliance 110 may operate to determine when a particular CUMR has a low device count, and can determine that such a component is rarely updated based upon the low device count. Such information may be utilized by a datacenter administrator to schedule upgrades or replacement of the particular component. In another example, update appliance 110 may operate to compile a total device count and update count based upon the CUMRs. Such information may be utilized to determine risk factors for the datacenter. In a further example, an indication that a particular type of component is associated with a large number of CUMRs may be utilized to indicate that the particular type of component is unstable, and suitable alternatives may be sought. Further, CUMRs may be utilized to identify clusters, or groups of devices that utilize a specific update, and to track upgrade paths for the components.

The embodiments described may provide various advantages over current component upgrade practices. For example, where an update appliance is self-contained, such as in a NAS, no additional storage allocation or management is needed. Note here that a component update CAS of an update appliance may be unique from standard CAS devices, in that, in the standard CAS device, the lifecycle of objects are governed by external clients. In a component update CAS, the lifecycle is maintained automatically—and is determined by the presence or absence of devices and baselines. Further, the physical objects described within the component update CAS, that is, the updates stored in a blob storage, can be deleted and re-fetched without any loss of functionality.

Figure 3:
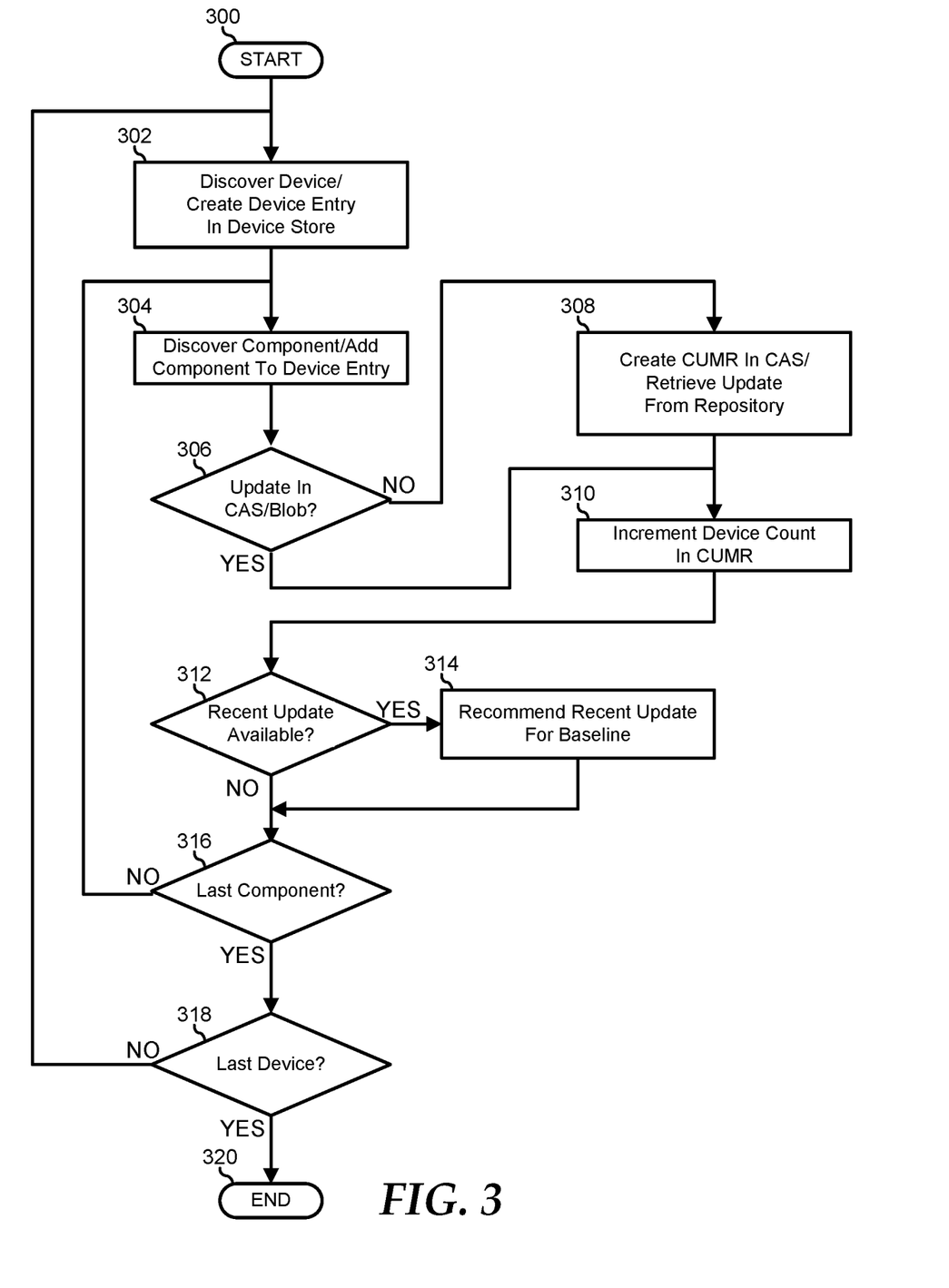
FIG. 3 is a flowchart illustrating a method for discovering devices in an update appliance according to an embodiment of the current disclosure.

FIG. 3 illustrates a method for discovering devices in an update appliance, starting at block 300. An update appliance discovers a first device of an update system and creates a device entry in a device store of the update appliance in block 302. The update appliance discovers a first component of the device, and adds a component entry for the component to the device entry in block 304. The component entry includes an update version that is currently utilized by the component. A decision is made as to whether or not a CUMR associated with the update version is stored in a component update CAS of the update appliance and the update version is stored in a blob storage of the update appliance in decision block 306. If not, the "NO" branch of decision block 306 is taken, a new CUMR associated with the update version is created in the component update CAS, the update version is retrieved from an update repository in block 308, and the method proceeds to block 310. Note that in an alternative embodiment, the update version is not retrieved from the update repository until such time as a component needs the update version. If a CUMR associated with the update version is stored in a component update CAS of the update appliance and the update version is stored in a blob storage of the update appliance, the "YES" branch of decision block 306 is taken and the method proceeds to block 310. In block 310, the device count in the CUMR associated with the update version is incremented.

A decision is made as to whether or not a newer version of the update is available in the update repository in decision block 312. If so, the "YES" branch of decision block 312 is taken and the update appliance provides a recommendation that a baseline entry for the first device should be updated such that the new version of the update is installed for the component in block 314, and the method proceeds to decision block 316. If a newer version of the update is not available in the update repository, the "NO" branch of decision block 312 is taken and the method proceeds to decision block 316. In decision block 316, a decision is made as to whether or not the discovered component is a last component of the device. If not, the "NO" branch of decision block 316 is taken and the method returns to block 304 where a next component of the device is discovered. If the originally discovered component is the last component of the device, the "YES" branch of decision block 316 is taken and a decision is made as to whether or not the device is the last device of the update system in decision block 318. If not, the "NO" branch of decision block 318 is taken and the method returns to block 302 where a next device of the update system is discovered. If the device is the last device, the "YES" branch of decision block 318 is taken and the method ends in block 320.

Figure 4:
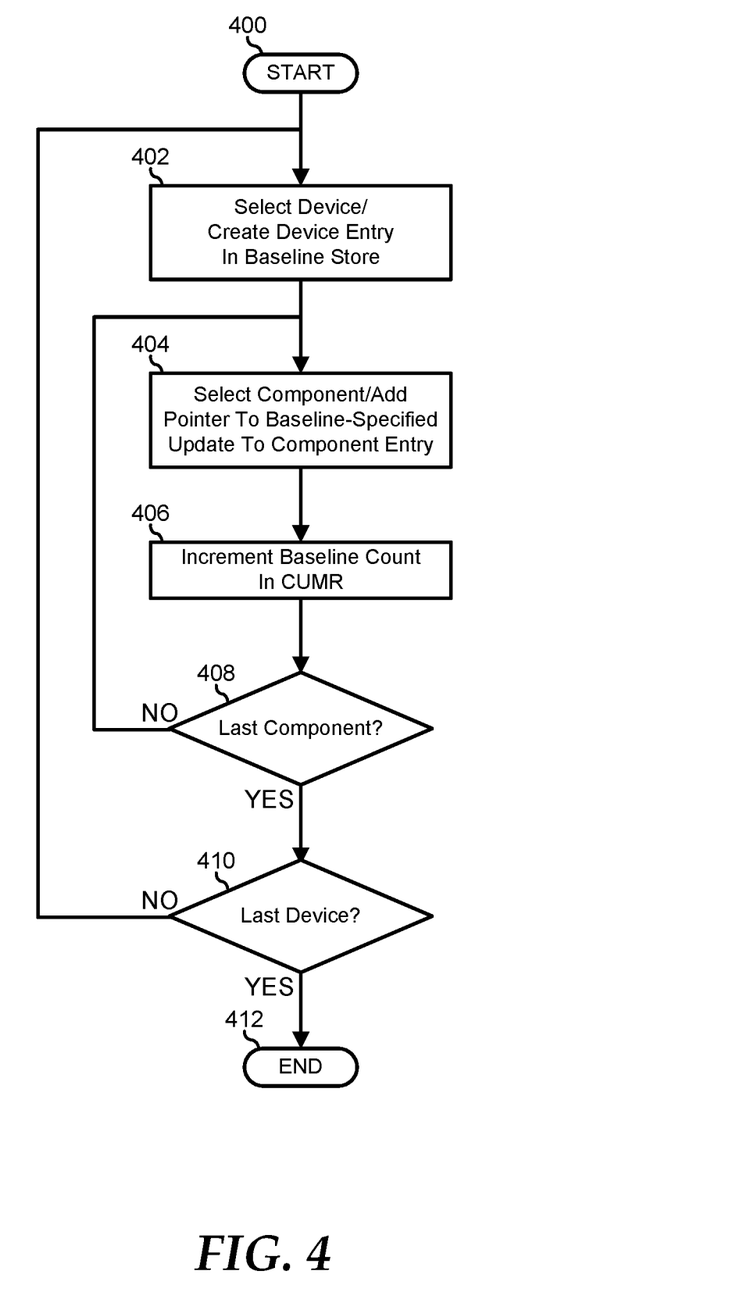
FIG. 4 is a flowchart illustrating a method for creating baseline device entries in an update appliance according to an embodiment of the current disclosure.

FIG. 4 illustrates a method for creating baseline device entries in an update appliance, starting at block 400. A first device is selected and a device entry is created for the selected device in a baseline store in block 402. A component of the device is selected and a pointer to a baseline-specified update is added to a baseline component entry in the baseline device entry in block 404. The baseline count of the CUMR of associated with the baseline-specified update is incremented in block 406. A decision is made as to whether or not the selected component is a last component of the selected device in decision block 408. If not, the "NO" branch of decision block 408 is taken and the method returns to block 404 where a next component of the device is selected. If the originally selected component is the last component of the device, the "YES" branch of decision block 408 is taken and a decision is made as to whether or not the device is the last device of the update system in decision block 410. If not, the "NO" branch of decision block 410 is taken and the method returns to block 402 where a next device of the update system is selected. If the device is the last device, the "YES" branch of decision block 410 is taken and the method ends in block 412.

Figure 5:
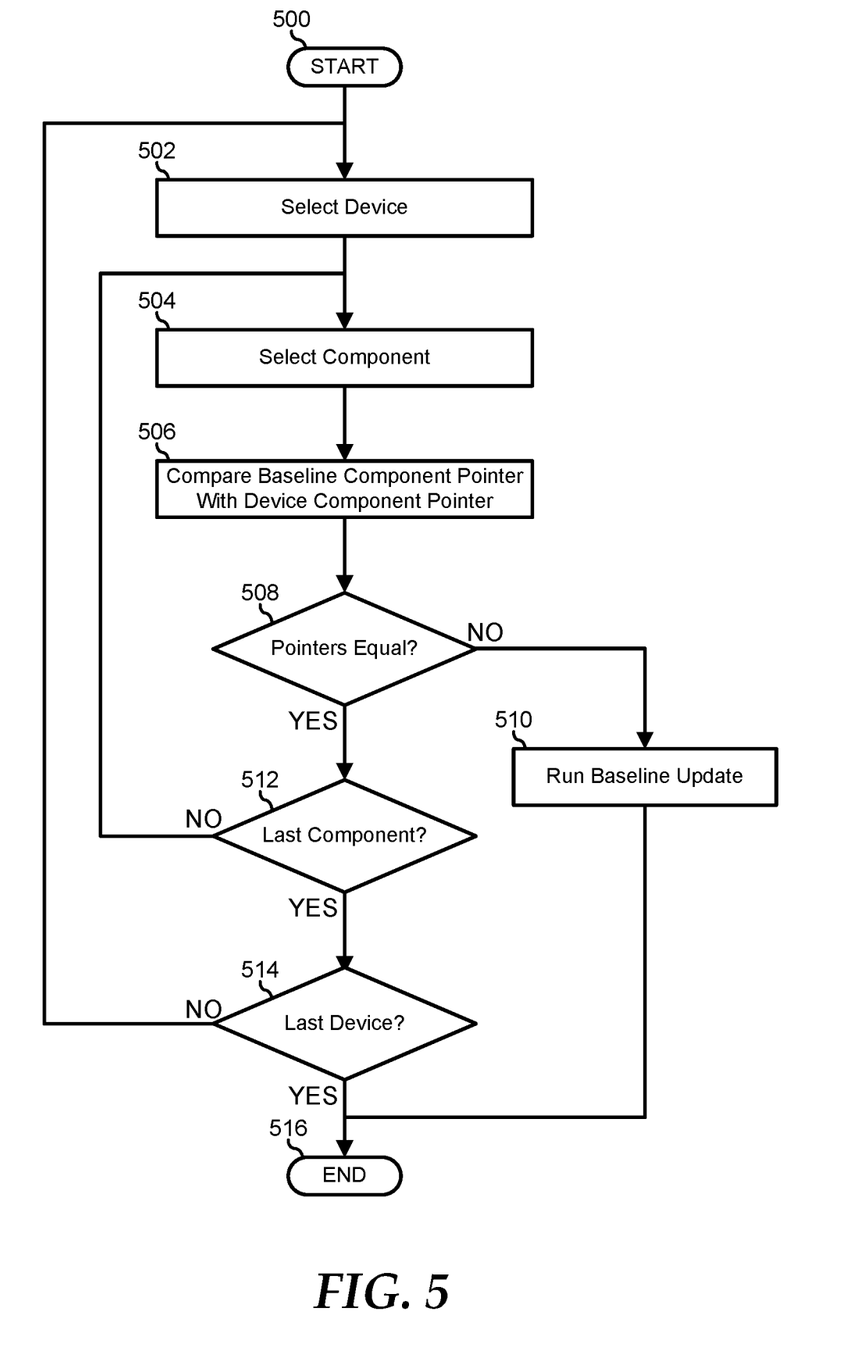
FIG. 5 is a flowchart illustrating a method for updating components in a datacenter using an update appliance according to an embodiment of the current disclosure.

FIG. 5 illustrates a method for updating components in a datacenter using an update appliance, starting at block 500. A first device of the update system is selected in block 502, and a first component of the device is selected in block 504. A baseline component pointer for the selected component is compared with a desired component pointer in block 506, and a decision is made as to whether or not the baseline component pointer is equal to the desired component pointer in decision block 508. If not, the "NO" branch of decision block 508 is taken, a baseline update is run in block 510 and the method ends in block, 516. If the baseline component pointer is equal to the desired component pointer, the "YES" branch of decision block 508 is taken and a decision is made as to whether or not the selected component is a last component of the selected device in decision block 512. If not, the "NO" branch of decision block 512 is taken and the method returns to block 504 where a next component of the device is selected. If the originally selected component is the last component of the device, the "YES" branch of decision block 512 is taken and a decision is made as to whether or not the device is the last device of the update system in decision block 514. If not, the "NO" branch of decision block 614 is taken and the method returns to block 502 where a next device of the update system is selected. If the device is the last device, the "YES" branch of decision block 514 is taken and the method ends in block 516.

Figure 6:
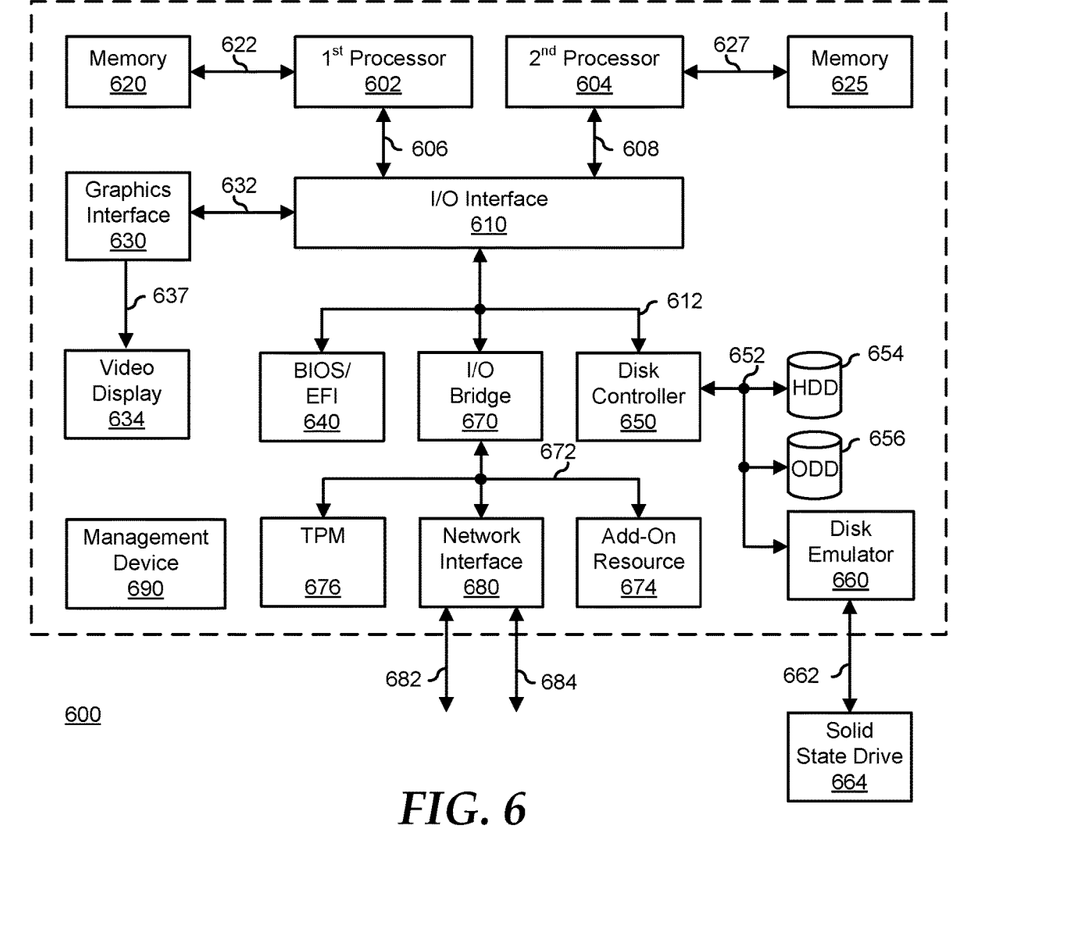
FIG. 6 is a block diagram illustrating a generalized information handling system according to another embodiment of the present disclosure.

FIG. 6 illustrates a generalized embodiment of an information handling system 600 similar to information handling systems 100 and 200. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described below, and operates to perform one or more of the methods described below. Information handling system 600 includes a processors 602 and 604, an input/output (I/O) interface 610, memories 620 and 625, a graphics interface 630, a basic input and output system/universal extensible firmware interface (BIOS/UEFI) module 640, a disk controller 650, a hard disk drive (HDD) 654, an optical disk drive (ODD) 656, a disk emulator 660 connected to an external solid state drive (SSD) 662, an I/O bridge 670, one or more add-on resources 674, a trusted platform module (TPM) 676, a network interface 680, a management device 690, and a power supply 695. Processors 602 and 604, I/O interface 610, memory 620, graphics interface 630, BIOS/UEFI module 640, disk controller 650, HDD 654, ODD 656, disk emulator 660, SSD 662, I/O bridge 670, add-on resources 674, TPM 676, and network interface 680 operate together to provide a host environment of information handling system 600 that operates to provide the data processing functionality of the information handling system. The host environment operates to execute machine-executable code, including platform BIOS/UEFI code, device firmware, operating system code, applications, programs, and the like, to perform the data processing tasks associated with information handling system 600.

In the host environment, processor 602 is connected to I/O interface 610 via processor interface 606, and processor 604 is connected to the I/O interface via processor interface 608. Memory 620 is connected to processor 602 via a memory interface 622. Memory 625 is connected to processor 604 via a memory interface 627. Graphics interface 630 is connected to I/O interface 610 via a graphics interface 632, and provides a video display output 636 to a video display 634. In a particular embodiment, information handling system 600 includes separate memories that are dedicated to each of processors 602 and 604 via separate memory interfaces. An example of memories 620 and 630 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 640, disk controller 650, and I/O bridge 670 are connected to I/O interface 610 via an I/O channel 612. An example of I/O channel 612 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 610 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 640 includes BIOS/UEFI code operable to detect resources within information handling system 600, to provide drivers for the resources, initialize the resources, and access the resources. BIOS/UEFI module 640 includes code that operates to detect resources within information handling system 600, to provide drivers for the resources, to initialize the resources, and to access the resources.

Disk controller 650 includes a disk interface 652 that connects the disk controller to HDD 654, to ODD 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits SSD 664 to be connected to information handling system 600 via an external interface 662. An example of external interface 662 includes a USB interface, an IEEE 1394 (Firewire) interface, a proprietary interface, or a combination thereof. Alternatively, solid-state drive 664 can be disposed within information handling system 600.

I/O bridge 670 includes a peripheral interface 672 that connects the I/O bridge to add-on resource 674, to TPM 676, and to network interface 680. Peripheral interface 672 can be the same type of interface as I/O channel 612, or can be a different type of interface. As such, I/O bridge 670 extends the capacity of I/O channel 612 when peripheral interface 672 and the I/O channel are of the same type, and the I/O bridge translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as I/O interface 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Management device 690 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 600. In particular, management device 690 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 600, such as system cooling fans and power supplies. Management device 690 can include a network connection to an external management system, and the management device can communicate with the management system to report status information for information handling system 600, to receive BIOS/UEFI or system firmware updates, or to perform other task for managing and controlling the operation of information handling system 600. Management device 690 can operate off of a separate power plane from the components of the host environment so that the management device receives power to manage information handling system 600 when the information handling system is otherwise shut down. An example of management device 690 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 690 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims.

In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system update appliance, comprising:
   a processor; and
   at least one memory device including:
   a Content Addressable Storage (CAS) space, wherein objects stored in the CAS space are accessed based upon a hash; and
   a location addressable storage space, wherein objects stored in the location addressable storage space are accessed based upon location addresses of the objects in the location addressable storage space, the location addressable storage space partitioned into an object storage space and a device storage space;
   wherein the processor is configured to:
   store a first device entry in the device storage space, the first device entry being associated with a device external to the system update appliance, the first device entry including a first component entry for a component of the device, the component operating based upon a first update at a first version level, the first update including first code utilized by the component, the first component entry including a description of the component and a first pointer to a first record stored in the CAS space; and
   store the first record in the CAS space, the first record being associated with a combination of the component and the first update, the first record including the description of the component, a second pointer to an update repository external to the system update appliance, and a third pointer to the object storage space, wherein the update repository includes the first update, and wherein when the first update is not stored in the object storage space, the third pointer is a null pointer and when the first update is stored in the object storage space, the third pointer includes a first address of the first update in the object storage space.

2. The system update appliance of claim 1, wherein the processor is further configured to:
   determine that the first update is not stored in the object storage space;
   download the first update from the update repository;
   store the first update to the object storage space at the first address; and
   modify the third pointer to include the first address.

3. The system update appliance of claim 1, wherein:
   the location addressable storage space is further partitioned into a baseline storage space;
   the processor is further configured to:
   store a second device entry associated with the device to the baseline storage space, the second device entry including a second component entry for the component, the second component entry including the description of the component and a fourth pointer to a second record stored in the CAS space; and store the second record in the CAS space, the second record being associated with a combination of the component and a second update first update, the second record including the description of the component, a fifth pointer to the update repository, and a sixth pointer to the object storage space, wherein the update repository includes the second update, and wherein when the second update is not stored in the object storage space, the sixth pointer is the null pointer and when the second update is stored in the object storage space, the sixth pointer includes a second address of the second update in the object storage space, wherein the second update represents the first update at a second version level.

4. The system update appliance of claim 3, wherein the processor is further configured to:
determine that the fourth pointer is different from the first pointer.

5. The system update appliance of claim 4, wherein the processor is further configured to:
determine that the second update is not stored in the object storage space;
download the second update from the update repository;
store the second update to the object storage space at the second address; and
modify the sixth pointer to include the second address.

6. The system update appliance of claim 5, wherein the processor is further configured to:
direct the device to replace the first update with the second update; and
modify the first pointer to point to the second record.

7. The system update appliance of claim 1, wherein the processor is further configured to:
discover the device.

8. The system update appliance of claim 7, wherein the processor is further configured to:
discover the component.

9. The system update appliance of claim 1, wherein the first update comprises one of a BIOS update, a firmware update, a driver update, an operating system update, and a software program update.

10. A method, comprising:
providing, in a memory device of a system update appliance, a Content Addressable Storage (CAS) space, wherein objects stored in the CAS space are accessed based upon a hash;
providing, in the memory device, a location addressable storage space, wherein objects stored in the location addressable storage space are accessed based upon location addresses of the objects in the location addressable storage space;
partitioning the location addressable storage space into an object storage space and a device storage space;
storing, by a processor of the system update appliance, a first device entry in the device storage space, the first device entry being associated with a device external to the system update appliance, the first device entry including a first component entry for a component of the device, the component operating based upon a first update at a first version level, the first update including first code utilized by the component, the first component entry including a description of the component and a first pointer to a first record stored in the CAS space; and storing, by the processor, the first record in the CAS space, the first record being associated with a combination of the component and the first update, the first record including the description of the component, a second pointer to an update repository external to the system update appliance, and a third pointer to the object storage space, wherein the update repository includes the first update, and wherein when the first update is not stored in the object storage space, the third pointer is a null pointer and when the first update is stored in the object storage space, the third pointer includes a first address of the first update in the object storage space.

11. The method of claim 10, further comprising:
determining that the first update is not stored in the object storage space;
downloading the first update from the update repository;
storing the first update to the object storage space at the first address; and
modifying the third pointer to include the first address.

12. The method of claim 10, further comprising:
partitioning the location addressable storage space further into a baseline storage space;
storing a second device entry associated with the device to the baseline storage space, the second device entry including a second component entry for the component, the second component entry including the description of the component and a fourth pointer to a second record stored in the CAS space; and
storing the second record in the CAS space, the second record being associated with a combination of the component and a second update first update, the second record including the description of the component, a fifth pointer to the update repository, and a sixth pointer to the object storage space, wherein the update repository includes the second update, and wherein when the second update is not stored in the object storage space, the sixth pointer is the null pointer and when the second update is stored in the object storage space, the sixth pointer includes a second address of the second update in the object storage space, wherein the second update represents the first update at a second version level.

13. The method of claim 12, further comprising:
determining that the fourth pointer is different from the first pointer.

14. The method of claim 13, further comprising:
determining that the second update is not stored in the object storage space;
downloading the second update from the update repository;
storing the second update to the object storage space at the second address; and
modifying the sixth pointer to include the second address.

15. The method of claim 14, further comprising:
directing the device to replace the first update with the second update; and
modifying the first pointer to point to the second record.

16. The method of claim 10, wherein the first update comprises one of a BIOS update, a firmware update, a driver update, an operating system update, and a software program update.

17. An information handling system, comprising:
a device including a component, the component operating based upon a first update at a first version level, the first update including first code utilized by the component;
an update repository that includes the first update; and a system update appliance, including:
  a processor; and
  at least one memory device including:
    a Content Addressable Storage (CAS) space, wherein objects stored in the CAS space are accessed based upon a hash; and
    a location addressable storage space, wherein objects stored in the location addressable storage space are accessed based upon location addresses of the objects in the location addressable storage space, the location addressable storage space partitioned into an object storage space, and a device storage space;
  wherein the processor is configured to:
    store a first device entry in the device storage space, the first device entry being associated with the device, the first device entry including a first component entry for the component, the first component entry including a description of the component and a first pointer to a first record stored in the CAS space; and
    store the first record in the CAS space, the first record being associated with a combination of the component and the first update, the first record including the description of the component, a second pointer to the update repository, and a third pointer to the object storage space, and wherein when the first update is not stored in the object storage space, the third pointer is a null pointer and when the first update is stored in the object storage space, the third pointer includes a first address of the first update in the object storage space.

18. The information handling system of claim 17, wherein the processor is further configured to:
  determine that the first update is not stored in the object storage space;
  download the first update from the update repository;
  store the first update to the object storage space at the first address; and
  modify the third pointer to include the first address.

19. The information handling system of claim 17, wherein:
  the location addressable storage space is further partitioned into a baseline storage space;
  the processor is further configured to:
    store a second device entry associated with the device to the baseline storage space, the second device entry including a second component entry for the component, the second component entry including the description of the component and a fourth pointer to a second record stored in the CAS space; and
    store the second record in the CAS space, the second record being associated with a combination of the component and a second update first update, the second record including the description of the component, a fifth pointer to the update repository, and a sixth pointer to the object storage space, wherein the update repository includes the second update, and wherein when the second update is not stored in the object storage space, the sixth pointer is the null pointer and when the second update is stored in the object storage space, the sixth pointer includes a second address of the second update in the object storage space, wherein the second update represents the first update at a second version level.

20. The information handling system of claim 19, wherein the processor is further configured to:
  determine that the fourth pointer is different from the first pointer;
  determine that the second update is not stored in the object storage space;
  download the second update from the update repository;
  store the second update to the object storage space at the second address; and
  modify the sixth pointer to include the second address.

* * * * *